(12) United States Patent  
Barkley et al.

(10) Patent No.: US 8,449,409 B1  
(45) Date of Patent: May 28, 2013

(54) GOLF GREEN READER AND PUTTING AID

(76) Inventors: John Clinton Barkley, McKinney, TX (US); Benjamin Gerald Pemberton, McKinney, TX (US)

( * ) Notice: Subject to any disclaimer, the term of this patent is extended or adjusted under 35 U.S.C. 154(b) by 0 days.

(21) Appl. No.: 13/403,994

(22) Filed: Feb. 24, 2012

(51) Int. Cl.
*A63B 57/00* (2006.01)

(52) U.S. Cl.
USPC .......................................................... 473/404

(58) Field of Classification Search
USPC .......................................................... 473/404
See application file for complete search history.

(56) References Cited

U.S. PATENT DOCUMENTS

| 5,662,535 | A | 9/1997 | Smith |
| 6,638,173 | B2 | 10/2003 | Robinson |
| 6,997,823 | B2 | 2/2006 | Garza |
| 7,713,148 | B2 | 5/2010 | Sweeney |
| 2005/0101415 | A1* | 5/2005 | Sweeney ................... 473/407 |
| 2012/0127291 | A1* | 5/2012 | Mahoney ................... 348/62 |

\* cited by examiner

*Primary Examiner* — Dmitry Suhol
*Assistant Examiner* — Carl V Larsen

(57) ABSTRACT

A golf green reading device capable of displaying graphical putting aid to a user. The device captures both a plurality of distance measurements between the device and a putting green, and an angular orientation of the device. Using those measurements, the device computes the topography of a putting green. With the computed topography, the device constructs and displays graphical putting aid to a user.

12 Claims, 8 Drawing Sheets

GOLF GREEN READER AND PUTTING AID

CROSS-REFERENCE TO RELATED APPLICATIONS

Not Applicable

STATEMENT REGARDING FEDERALLY SPONSORED RESEARCH

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field

This application relates to golf aids. More particularly, this application relates to a device which obtains topographical data of putting greens. More particularly, this application relates to a device that, through use of obtained topographical data, displays graphical putting aid to a user.

2. Prior Art

Presently, most golfers base the direction and force of a putt upon a visual perception of a putting green's contours. Changes in elevation can be hard for the human eye to perceive. Some previous attempts to assist golfers in the reading of putting greens, such as U.S. Pat. Nos. 5,662,535 and 6,997,823, made use of levels and other perception altering mechanisms; however these devices only provided a vague, burdensome, and indirect method of reading a putting green's contours. Other previous attempts, such as U.S. Pat. Nos. 6,638,173 and 7,713,148, provided devices and methods that when provided with topographical data of a putting green, display aid in putting to a user. However, these methods require that topographical data exists for the putting green of interest, and that it is in the user's possession. In addition to this, topographical data for each putting green may require expensive surveying equipment and a time consuming survey process. Another shortcoming is the amount of memory required to hold topographical data for a large number of putting greens.

Accordingly, there is a need in the art for a device which can obtain topographical data of any putting green in real time, and then through the use of that data, display graphical putting aid to a user. Recent advances in three-dimensional imaging have made such a device practical.

BRIEF SUMMARY OF THE INVENTION

In accordance with one embodiment, the present invention is a device which obtains topographical data of a putting green, and then through the use of that data, displays graphical putting aid to a user.

DETAILED DESCRIPTION OF THE PREFERRED EMBODIMENT OF THE INVENTION

Figure 5:
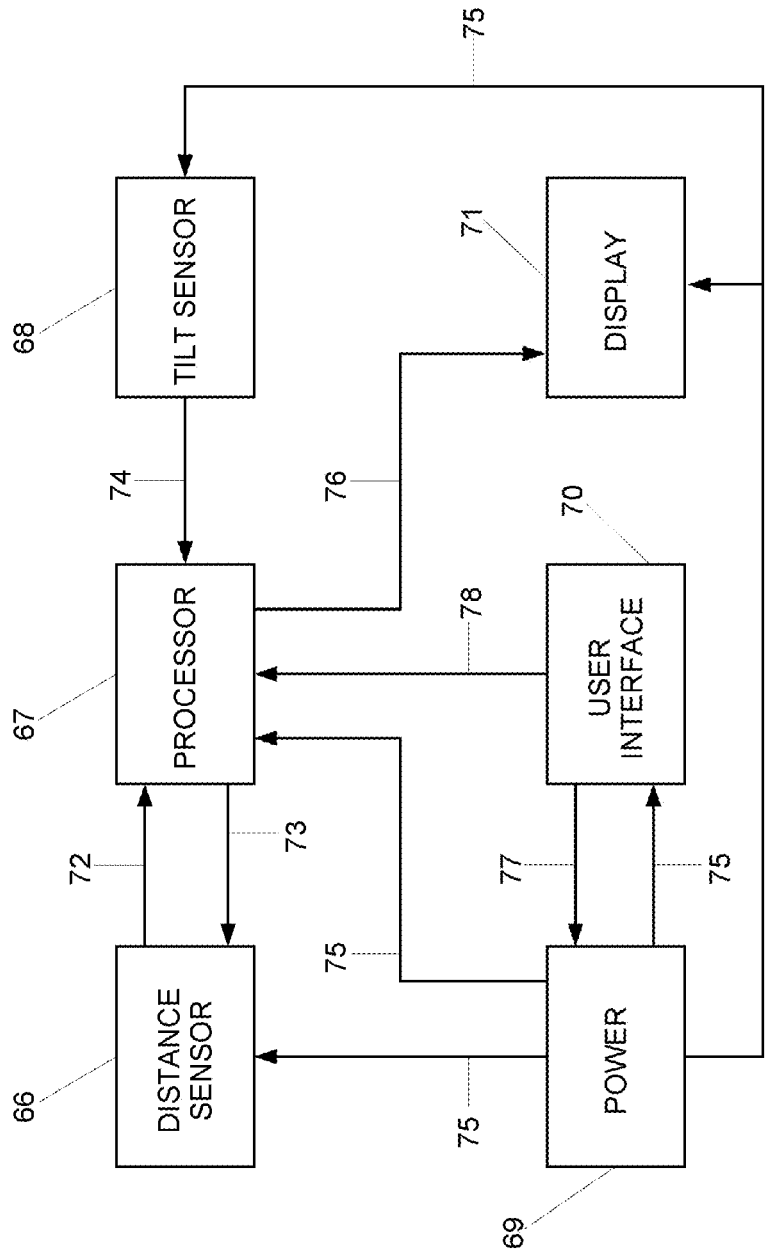
FIG. 5 is a block diagram representing the preferred embodiment's interconnections.
Figure 6A:
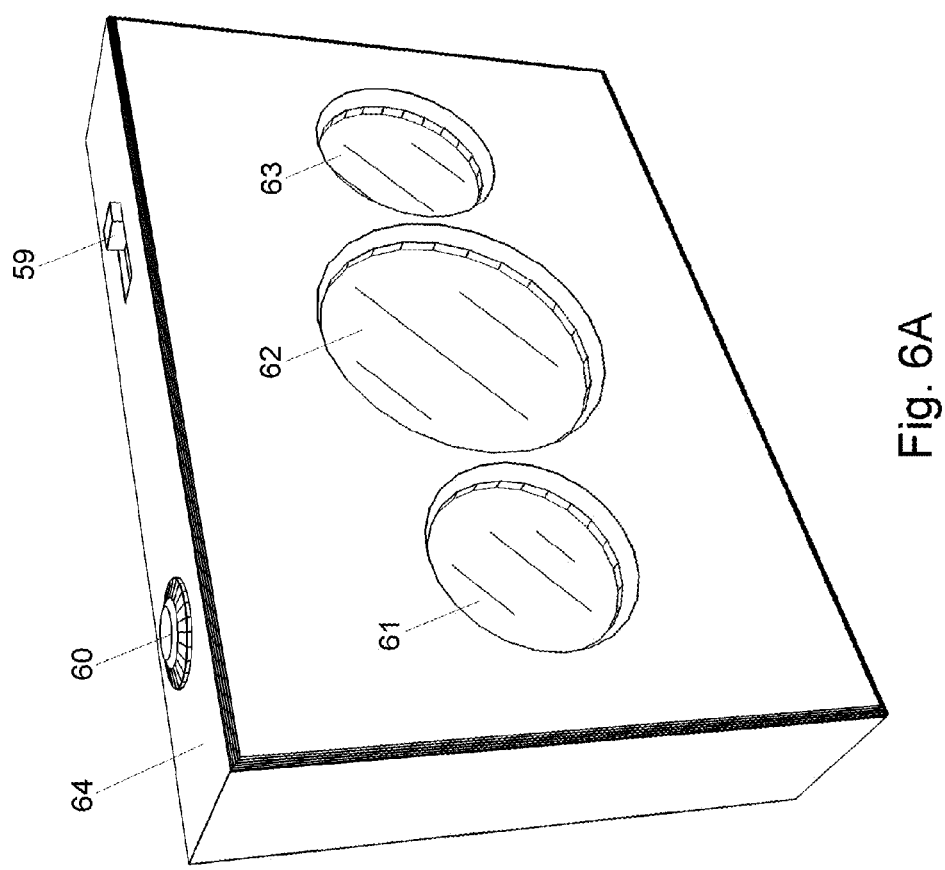
FIG. 6A is a perspective view showing the front side of the preferred embodiment.
Figure 6B:
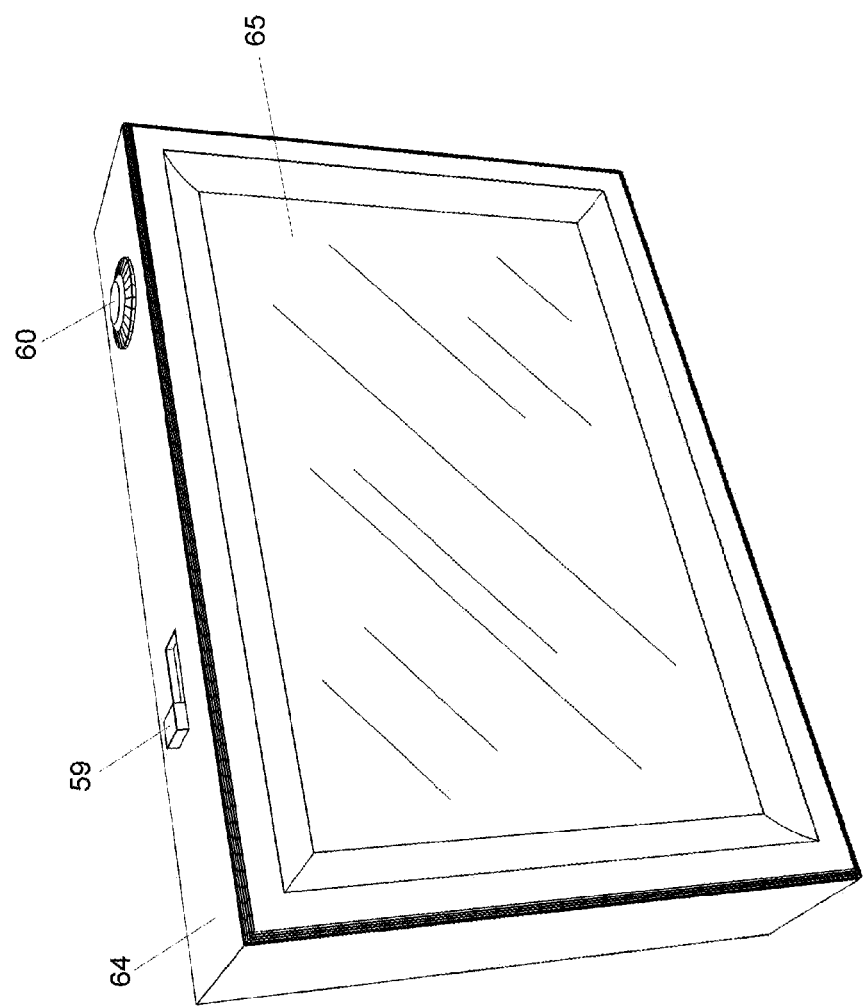
FIG. 6B is a perspective view showing the back side of the preferred embodiment.
Figure 6C:
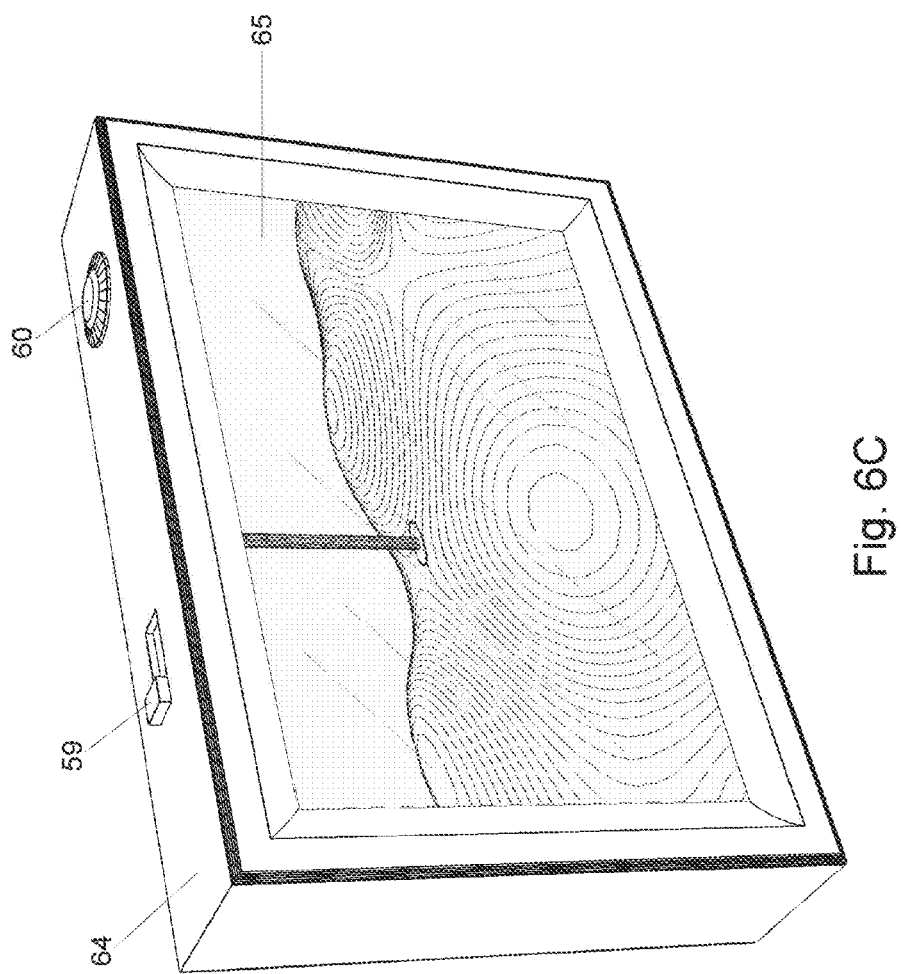
FIG. 6C is a perspective view showing the back side of the preferred embodiment with displayed graphical putting aid.

The preferred embodiment of the present invention is shown in FIG. 5 (interconnect diagram), FIG. 6A (front perspective view), FIG. 6B (rear perspective view), and FIG. 6C (rear perspective view with displayed graphical putting aid). The preferred embodiment of the present invention is comprised of a non-scanning time-of-flight distance sensor 66; a three-axis accelerometer-based tilt sensor 68; a processor 67; a flat panel color display 65/71; a user interface 70 comprised of a button 60, switch 59, and touchscreen element 65; a plastic rectangular housing 64; and a rechargeable lithium-ion battery with supporting power regulation circuitry 69. The distance sensor 66 receives a trigger 73 from the processor 67, and provides a plurality of distance measurements 72 to the processor 67. This plurality of distance measurements 72 typically consists of thousands of distance measurements between the distance sensor 66 and corresponding points on a surface of interest, which in this case is a putting green. The tilt sensor 68 provides the angular orientation 74 of the distance sensor 66, to the processor 67. The processor 67 uses the received angular orientation 74 and plurality of distance measurements 72 to compute the topography of the putting green, and provide user-specified graphical putting aid data 76 to the display 65/71. The user interface's 70 button 60 and touchscreen element 65 provide a trigger 78 for the construction of graphical putting aid and user inputs 78 to the processor 67, respectively. The housing 64 surrounds all other components with openings for the display 65/71, button 60, switch 59, and distance sensor's optics 61/62/63. The battery and supporting power regulation circuitry 69 is enabled 77 by the user interface's 70 switch 59, and provides power 75 to the display 65/71, distance sensor 66, tilt sensor 68, processor 67, and touchscreen element 65. The aforementioned components are explained as separate entities for a better understanding, but are not necessarily separate physical entities.

Operation

Figure 1:
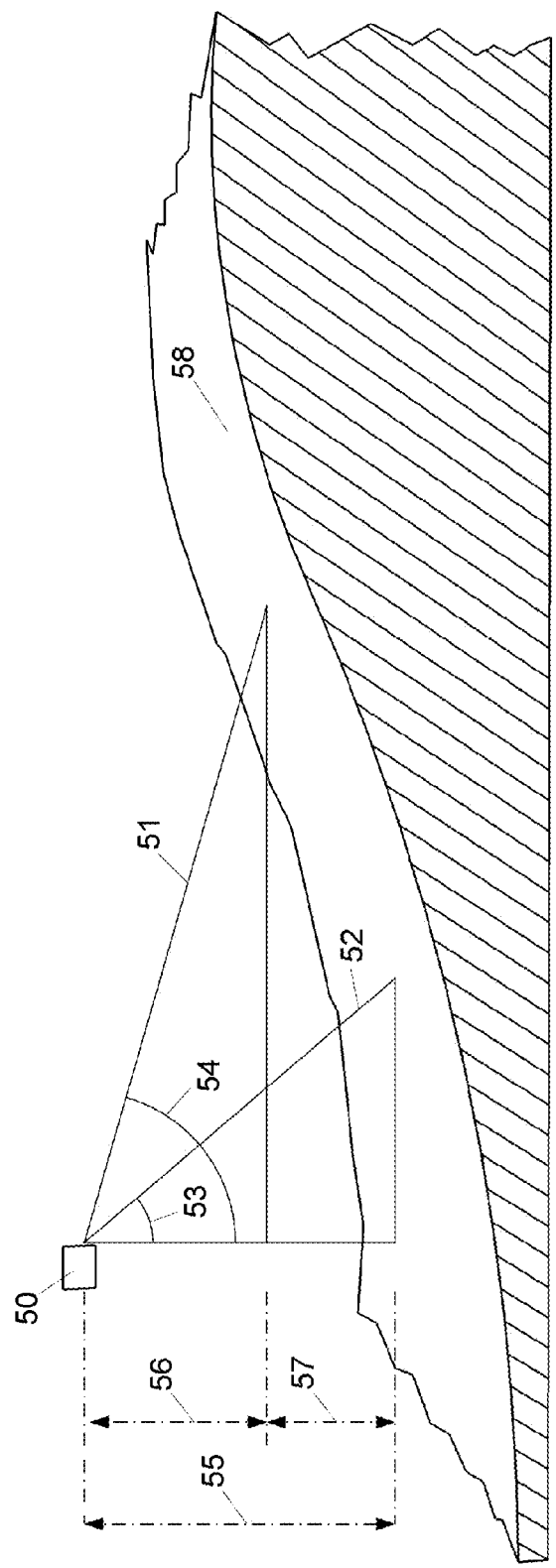
FIG. 1 is an illustration of the preferred embodiment's method for gathering topographical data of a putting green.
Figure 4:
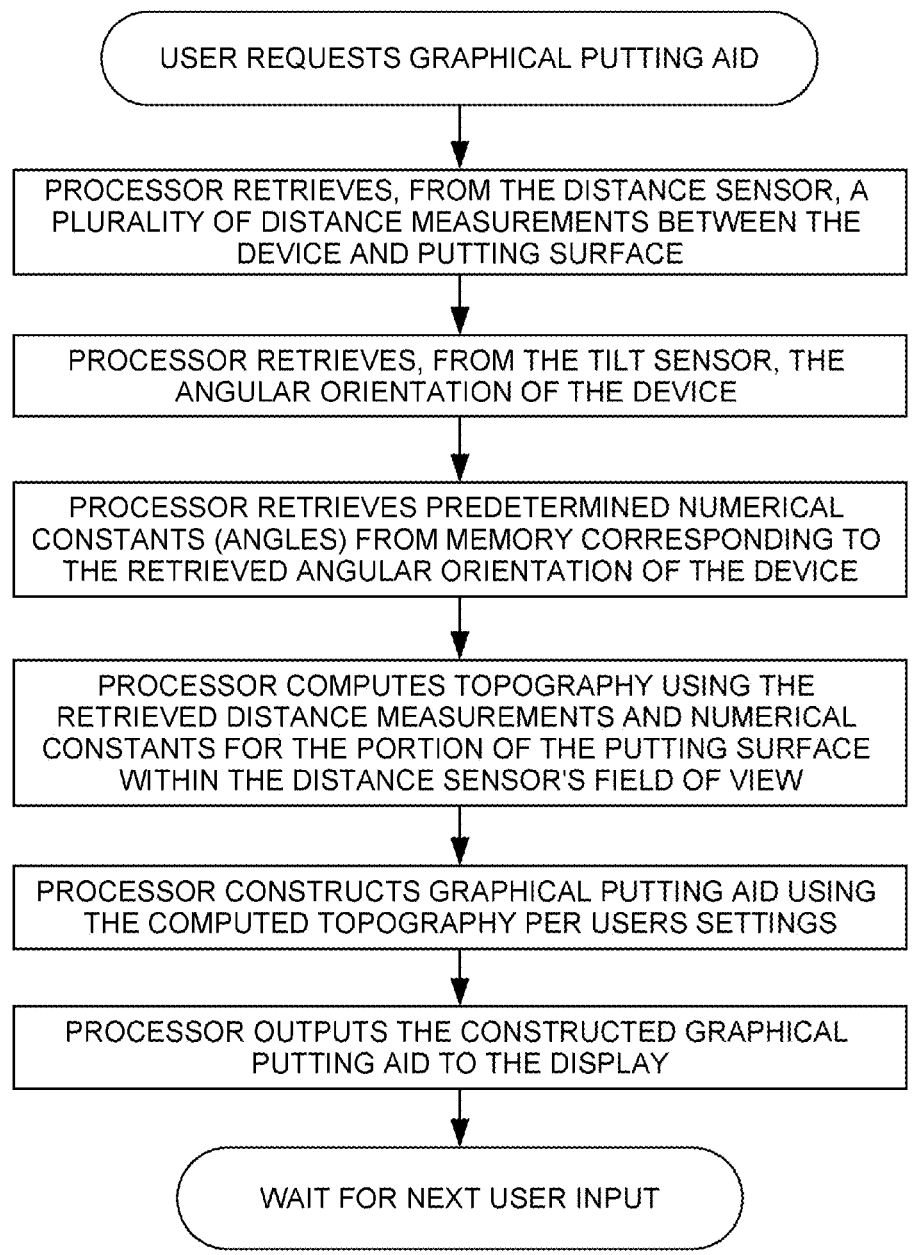
FIG. 4 is a flowchart outlining the process for obtaining topographical data of a putting green, and then through the use of that data, displaying graphical putting aid to a user.

Operation of the preferred embodiment of the present invention is explained in FIG. 4 and is detailed as follows. A user flips the power switch 59 applying power 75 to the display 65/71, distance sensor 66, tilt sensor 68, processor 67, and touchscreen element 65. The processor 67 then waits upon a trigger 78 from button 60, which indicates that a user has requested graphical putting aid of a putting green. Upon receipt of this trigger 78, the processor 67 retrieves a plurality of distance measurements 72 from the distance sensor 66, and an angular orientation 74 of the distance sensor 66 from the tilt sensor 68. Upon receipt of the angular orientation 74, the processor 67 retrieves corresponding predetermined numerical constants from memory on-board the processor 67 (numerical constants are gathered through a calibration process explained later in this section). Each numerical constant contains a predetermined angle between the corresponding distance measurement's line-of-sight and vertical. Examples of these angles are illustrated as reference numbers 53 and 54 in FIG. 1. The processor 67 then uses the received plurality of distance measurements 72 and numerical constants (angles) to compute the topography of the putting green. This process is depicted in FIG. 1 and explained in the following paragraph.

For every captured distance measurement, there is a corresponding numerical constant (angle). Each distance measurement is multiplied by the Cosine of its corresponding numerical constant (angle), producing a number which represents the vertical distance between the elevation of the distance sensor 66 and the elevation of the corresponding point on the putting surface 58. An example of this as illustrated in FIG. 1 is 56=51\*Cos(54), where 56 represents the vertical distance described above, 51 represents a distance measurement between the device 50 and putting surface 58, and 54 represents a numerical constant (angle). After the vertical distances described above have been computed, the elevation with respect to the lowest point within the distance sensor's 66 field-of-view is computed by subtracting each vertical distance from the maximum vertical distance. For example, if the assumption is made that reference number 55 in FIG. 1 represents the largest vertical distance in the distance sensor's 66 field-of-view, elevation 57 is computed as: 57=55−56. This is done for the entire plurality of distance measurements 72, thus computing the topography of the putting surface 58.

Figure 2:
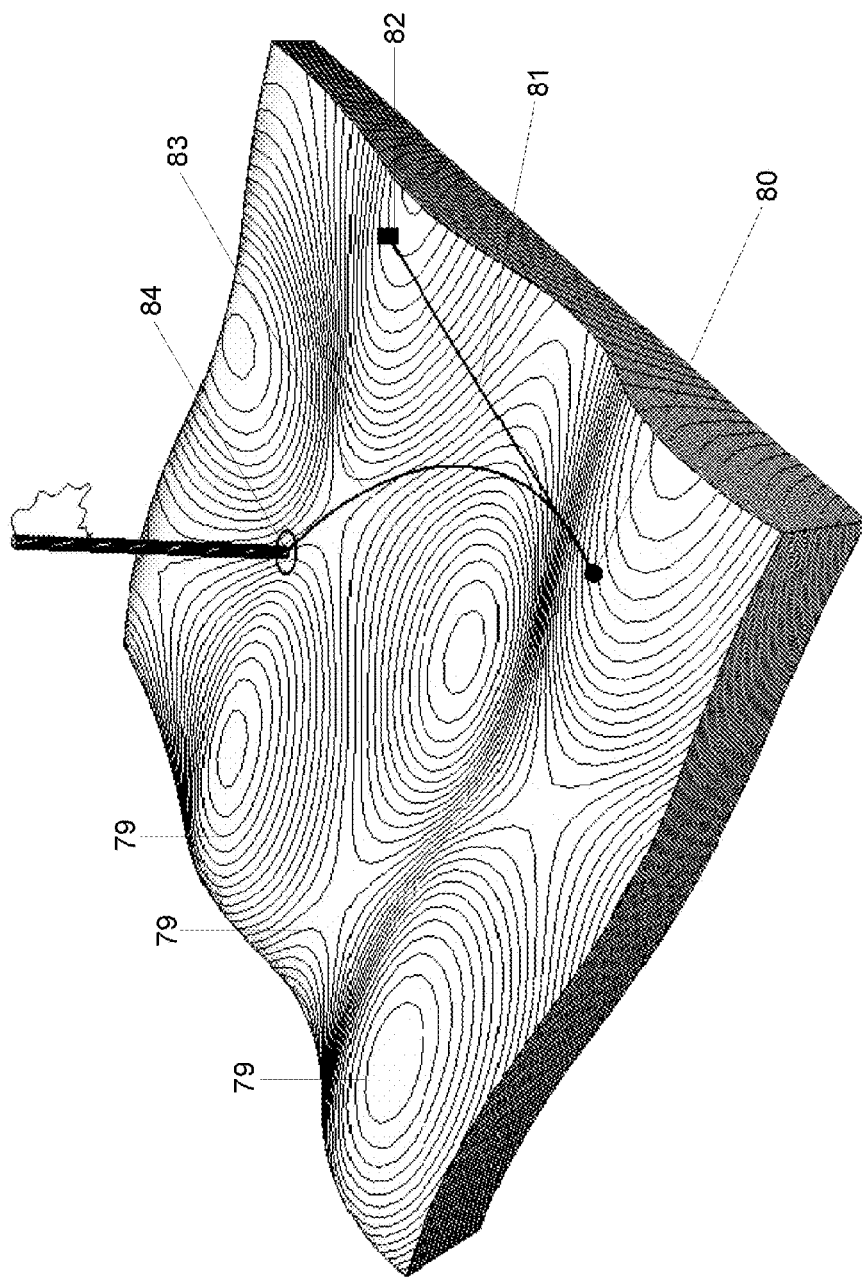
FIG. 2 is an example of graphical putting aid showing successful putt prediction and elevation interval lines.
Figure 3:
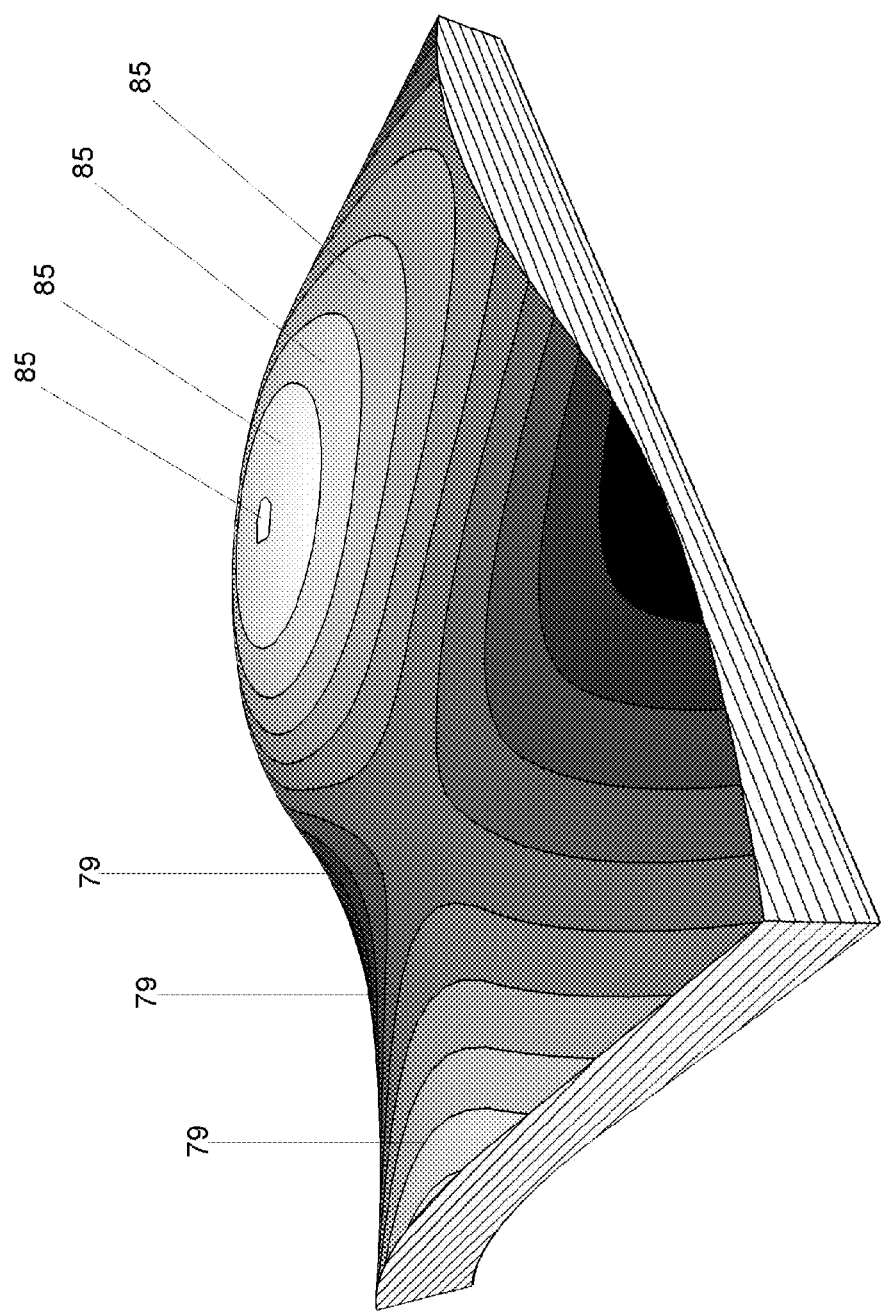
FIG. 3 is an example of graphical putting showing elevation shading and elevation interval lines.

Once topographical data has been computed, the processor 67 constructs a color frame comprising any user-specified graphical putting aid. Examples of graphical putting aid are illustrated in FIG. 2 and FIG. 3, and explained as follows. A user has the option to enable elevation shading 85, elevation interval lines 79, successful putt trajectory 83, and/or putting target point 82. Elevation shading 85 is applied by scaling color data to the computed topographical data. For example, pixels are colored from dark green to light yellow as elevation rises. This serves to display elevation changes in a manner easily perceived by the human eye. Elevation interval lines 79, used in topographical maps to indicate changes in elevation, are applied by coloring pixels black when the elevation is within a predetermined threshold. A successful putt trajectory 83 is computed using basic kinematics. First, the golf ball's 80 and hole's 84 locations are determined with a simple image processing algorithm. In the preferred embodiment, marked regions on the display 65/71 indicate areas to place the golf ball 80 and hole 84 when aiming the device 64. This serves to fully utilize the resolution of the distance sensor 66, and eases the process of locating the golf ball 80 and hole 84. Changes in elevation and color within these marked regions on the display 65/71 indicate the locations of the golf ball 80 and hole 84. With these locations, a rough estimate of a successful putt is computed, and the calculated point at which the golf ball 80 stops is temporarily saved. Suppose this point is short and right of the hole 84. The next estimated putt would then be adjusted longer and left proportionally. This continues until the putt successfully arrives at the targeted hole 84. The putting target point 82 is determined by projecting the determined successful putt over a flat surface whose straight line trajectory is represented by reference number 81. The point at which the golf ball 80 is calculated to stop rolling is marked as the target point 82 for a successful putt. After the color frame has been constructed, the processor 67 transmits this color frame, or graphical putting aid data 76, to the display 65/71, thus fulfilling the request 78 of the user for graphical putting aid.

Numerical constants (angles) are gathered through a calibration process by pointing the device from a known height at a known flat surface, and calculating the angle between each distance measurement's line-of-sight and vertical. Since the surface is known to be flat, the elevation is constant. The angle, X, between a distance measurement's line-of-sight and vertical is calculated as X=ArcCos(V/D), where V is the known height of the device, and D is the measured distance between the device and the flat surface. This is done at all lines-of-sight for a large number of angular orientations. The numerical constants (angles) are stored into memory on board the processor 67.

CONCLUSIONS, RAMIFICATIONS, AND SCOPE

Accordingly, the reader will see that the present invention provides users with a much simpler and useful putting aid. All that is required of a user is to point the device 64 and press a button 60. Not only is it simple to use, but it provides graphical putting aid in real time. Also, there is no need to search or pay for topographical data of a putting green, since the present invention creates its own. This means that the present invention can be used on any putting surface at any time.

While the above description contains many specificities, these should not be construed as limitations on the scope of any embodiment, but as exemplifications of the presently preferred embodiments thereof. Many other ramifications and variations are possible within the teachings of the various embodiments. For example, the display 65/71 need not necessarily be a flat panel color display. The display 65/71 could be internal to the device seen looking through a peephole. The display 65/71 could be any means of exhibiting visual aid to a user. Furthermore, it is not necessary to place marked regions on the display 65/71 for placement of the golf ball 80 and hole 84 when aiming the device 50. This is merely a preference of the preferred embodiment. The distance sensor 66 could be any kind of scanning or non-scanning distance sensor. Viable methods for a distance sensing unit could be through the use of stereo triangulation, sheet of light triangulation, time-of-flight camera, LIDAR, structured light 3D scanner, interferometry, or many other distance sensing methodologies. The distance sensor 66 could be any device that measures distance from one point to the next. The tilt sensor 68 need not be a three-axis accelerometer. It could be a two-axis accelerometer, or any other device measuring an angular orientation of an object. Furthermore, a tilt sensor 68 is not necessarily required for functionality of the present invention. Likewise, the corresponding calibration process is not required, but rather a preference of the preferred embodiment. The processor 67 can be any circuit which performs the required computations. This circuit could be built around a micro-controller, FPGA, or many other components. The user interface 70 could be any combination of buttons, switches, dials, keys, touchscreens, or any other means through which a user communicates to the present invention. The housing 64 need not be rectangular or plastic. The housing 64 could come in any shape, size, or material. The power unit 69 could be any device through which power is applied to the components of the present invention.

Thus the scope of the invention should be determined by the appended claims and their legal equivalents, and not by the examples given.

The invention claimed is:

1. A device for providing graphical putting aid, comprising:
   a. a housing,
   b. a processor mounted in said housing and configured for construction of said graphical putting aid given a plurality of distance measurements between said device and a putting surface, c. a distance sensor mounted in said housing for providing said plurality of distance measurements to said processor, and d. a display mounted in said housing for presentation of said graphical putting aid;

whereby said processor computes the topography of said putting surface using said plurality of distance measurements, and then through use of the said topography, constructs and outputs said graphical putting aid to said display.

2. The device of claim 1 further comprising a tilt sensor for providing an angular orientation of said distance sensor to said processor; whereby said processor uses said angular orientation and said plurality of distance measurements for said construction of said graphical putting aid.

3. The device of claim 2 wherein said tilt sensor comprises an accelerometer.

4. The device of claim 2 further comprising a memory storage element for storing predetermined numerical constants; whereby said processor uses said predetermined numerical constants, said angular orientation, and said plurality of distance measurements for said construction of said graphical putting aid.

5. The device of claim 1 further comprising a user interface for receiving user inputs to said processor; whereby said user can send a request for said graphical putting aid and apply settings for customization of said graphical putting aid.

6. The device of claim 1 wherein said display comprises a color flat-panel display.

7. The device of claim 1 wherein said distance sensor comprises a time-of-flight camera.

8. The device of claim 1 wherein said graphical putting aid comprises at least one of: elevation shading, elevation interval markings, successful putt trajectory, and putting target point.

9. A method of providing graphical putting aid, comprising:

a. providing a housing;

b. providing a distance sensor, mounted in said housing, which is able to measure a plurality of distances;

c. measuring, with said distance sensor, a plurality of distances between said distance sensor and a putting surface;

d. providing a processor mounted in said housing which is configured to:
  i. compute the topography of said putting surface given said plurality of distances, and
  ii. construct said graphical putting aid using said topography;

e. providing a display mounted in said housing which is able to display graphical images; and f. displaying, with said display, said graphical putting aid.

10. The method of claim 9 further comprising a step for measuring an angular orientation of said distance sensor, with a provided tilt sensor, prior to computing said topography; whereby said processor uses said angular orientation in conjunction with said plurality of distances to compute said topography.

11. The method of claim 10 further comprising a step wherein said processor retrieves predetermined numerical constants from memory corresponding to said angular orientation, prior to computing said topography; whereby said processor uses said predetermined numerical constants in conjunction with said plurality of distances to compute said topography.

12. The method of claim 9 wherein said graphical putting aid comprises at least one of: elevation shading, elevation interval markings, successful putt trajectory, and putting target point.

* * * * *